(No Model.)
R. W. CHAPPELL.
ROW GUIDE.
No. 293,629. Patented Feb. 19, 1884.
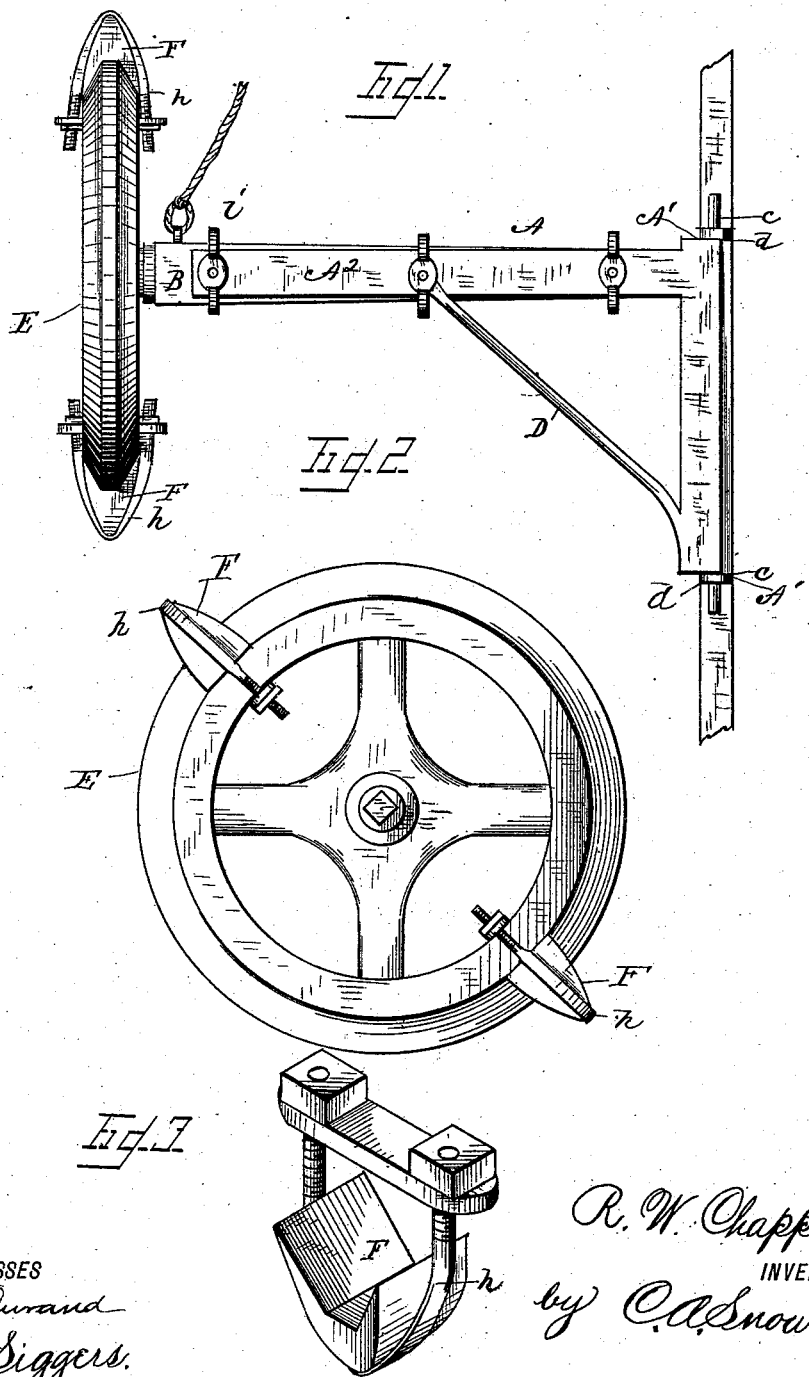
WITNESSES
F. L. Durand
E. G. Siggers.
R. W. Chappell
INVENTOR
by C. A. Snow & Co
Attorneys

UNITED STATES PATENT OFFICE.

ROBERT W. CHAPPELL, OF WAVERLY, VIRGINIA.

ROW-GUIDE.

SPECIFICATION forming part of Letters Patent No. 293,629, dated February 19, 1884.

Application filed September 10, 1883. (No model.)

*To all whom it may concern:*

Be it known that I, ROBERT W. CHAPPELL, a citizen of the United States, residing at Waverly, in the county of Sussex and State of Virginia, have invented a new and useful Row-Guide, of which the following is a specification, reference being had to the accompanying drawings.

This invention relates to attachments for agricultural implements, and the objects of the same are to provide guide means for laying off corn, cotton, &c., rows in the field, and to so connect the marker to the plow-beam, or a central bar of the machine, that the marker can be shifted to either side of the planter without detaching the same, as will be hereinafter more fully set forth.

My invention consists in the novel construction and arrangement of parts, as will be hereinafter more fully described.

In the annexed drawings, Figure 1 represents a plan view of my attachments, shown in full lines, in connection with a plow-beam, as indicated by dotted lines. Fig. 2 represents a side view of the marking-wheel with the adjustable hill-markers, and Fig. 3 is a perspective view of one of the hill-markers detached from marking-wheel.

In the annexed drawings, A represents a triangular frame, made of metal or other suitable material, and suitably braced by the diagonal bar D. The ends of the longitudinal bar A' of the frame A are formed with axial bearings $c$ $c$, working in eyes on the ends of the supports $d$ $d$, attached in this example to a plow-beam.

To the transverse bar A² of the frame A is adjustably attached, by means of bolts, a bar or axle, B, formed at its outer end with a suitable spindle for the reception of a marking-wheel, about to be described.

The marking-wheel E may be of any suitable construction and diameter, but the felly or tire should be made V-shaped, or a similar shape, in cross-section, so as to cause it to move more evenly in the furrow of the row. To the periphery of the marking-wheel are secured the markers F, by means of the clip-bolts $h$, passed around them and over the fellies of the wheel. Any number of these markers, which are preferably made tapering, may be employed on each wheel, and the distance between each regulated by the clamping clip-bolts.

To the outer end of the bar B is attached an eye-staple, $i$, to which is fastened a cord extending back to the driver or follower of the implement, for raising the wheel whenever it comes in contact with an obstruction, or the shifting of the marker to the other side of the implement when a row is finished.

The parts being properly organized substantially as seen in Fig. 1 of the drawings, and the necessary adjustment made to secure the rows at a proper distance apart, one straight row is first made, into which is placed the marking-wheel, and by the movement of the said wheel in this row the second parallel row is formed by the plow or cultivator, and thus the operation of forming rows is continued by working the marking-wheel into the last-formed row. As the marking-wheel rotates within the row "hills" or depressions are formed, which indicate the properly-distanced spaces for the reception of the seed to be planted.

By the axial connection of the frame to the plow-beam and the cord at the outer end of the said frame the driver is enabled to elevate the marking-wheel from coming in contact with obstructions, and also to shift the attachment to the other side of the plow-beam.

What I claim as my invention, and desire to secure by Letters Patent, is—

The land-marker herein described, comprising the combination of the triangular-shaped frame A, diagonal brace D, axle-bar B, marking-wheel E, with the adjustable markers F, and the axial bearings, substantially as described.

In testimony that I claim the foregoing as my own I have hereto affixed my signature in presence of two witnesses.

ROBERT W. CHAPPELL.

Witnesses:
J. A. CAPELL,
J. R. CAPELL, Jr.